SELECTIVE SIGNALING SYSTEM WITH NARROW BAND FEEDBACK
Filed Dec. 12, 1958
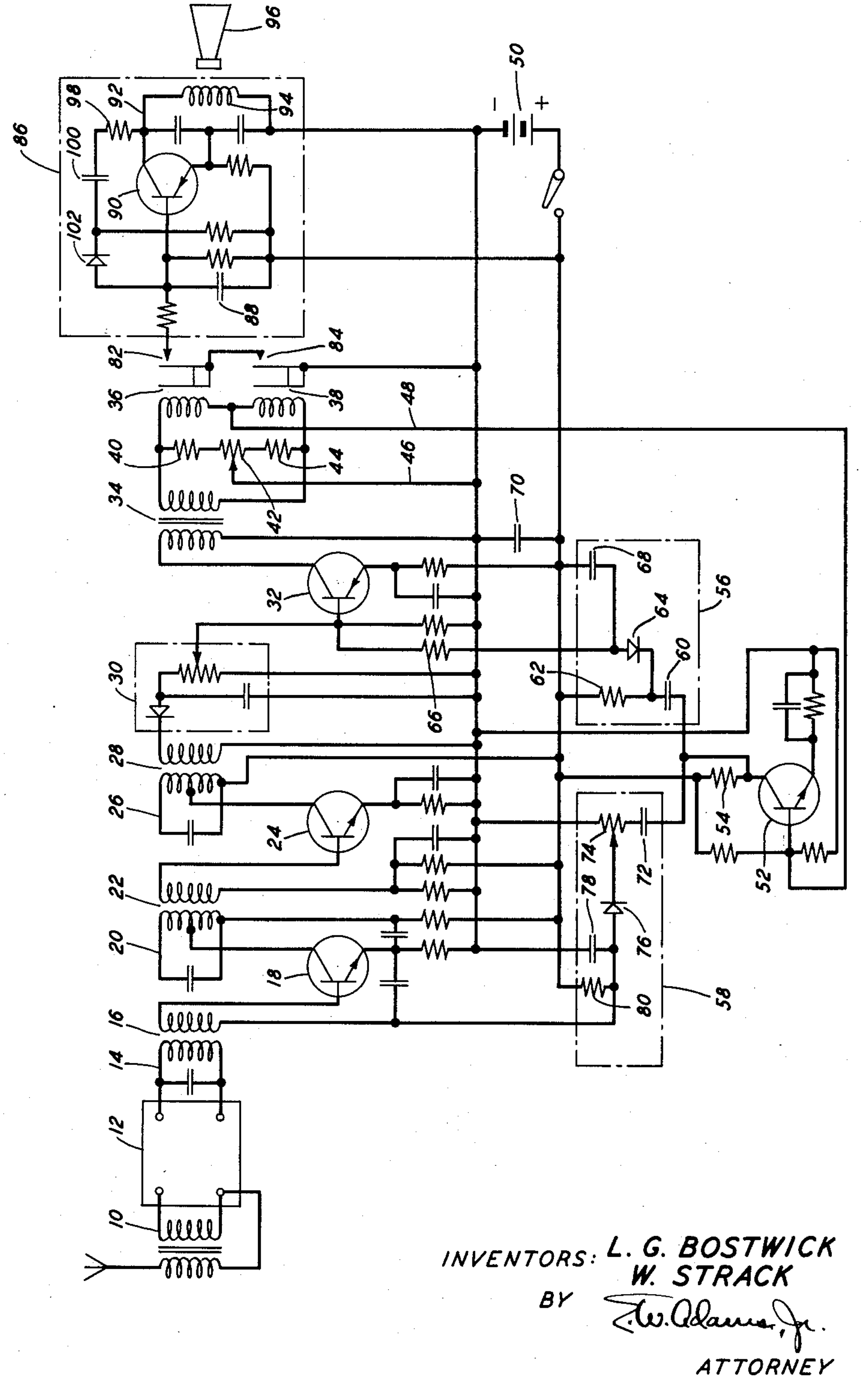
INVENTORS: L. G. BOSTWICK
W. STRACK
BY [signature]
ATTORNEY United States Patent Office 3,040,256
Patented June 19, 1962

3,040,256

SELECTIVE SIGNALING SYSTEM WITH NARROW BAND FEEDBACK

Lee G. Bostwick, Florham Park, N. J., and Walter Strack, Ballmore, N.Y., assignors to Bell Telephone Laboratories, Incorporated, New York, N.Y., a corporation of New York Filed Dec. 12, 1958, Ser. No. 780,089
8 Claims. (Cl. 250—20)

This invention relates to selective signaling devices and more particularly to selective signaling receivers embodying a radio receiver and a vibrating reed selector.

As commonly employed in selective signaling systems, and particularly in radio paging systems, tuned reed selectors are usually connected across the output of a radio receiver and each of the reeds is tuned to a different preselected resonant frequency. When these particular frequencies appear simultaneously at the output of the radio receiver, all of the tuned reeds will vibrate and thereby complete a signaling circuit which produces either a visual or audible signal.

In selective systems of this type, it is important to use high grain sensitive radio receivers that permit maximum signaling distances limited as little as possible by noise and interference. However, the radio field strength at other times may be very high and it is then a major operating concern to avoid false signaling of the receiver. This is usually caused by the slow release time of one or more of the reed selectors associated with the radio receiver. Release time of a reed selector may be defined as the time required after the input signal has ceased for the amplitude of the reed vibration to diminish to a value such that it is no longer completing the associated signaling circuit. The release time is a function of the level of the driving signal applied to the reed selectors. Therefore, the higher the driving signal level, the longer the release time. The tuned reeds usually exhibit an optimum operating level which depends on the structure of the selector, the type of signaling system employed, and the time interval between consecutive input signals. For the reed selectors employed in a typical specific embodiment of this invention, an operating level of 150 to 300 microwatts is preferred for the signal applied to the selectors. It can be readily observed that should a signal be received that is greater than the optimum operating level of the reeds, the release time would be such that although the input signal may contain only one of the particular resonant frequencies of the reeds, the reed may still be vibrating when a second input signal is received that contains the remaining particular frequencies. Thus, all reeds would be vibrating simultaneously and false signaling would occur. It is, therefore, highly desirable to limit the level of the driving signals which the reed selectors can receive to an amount not greater than the optimum operating level of the reeds.

One obvious way of appropriately limiting the driving signal level to meet the requirement set forth above involves the use of automatic gain control circuitry in the associated radio receiver. In most systems providing automatic gain control, a portion of the signal from the detector stage of the receiver is fed back into the receiver to change the bias on the tube or transistor in the intermediate frequency stage. This method is sensitive to broadband noise conditions in the detector of the receiver. In fact, the noise may actuate the automatic gain control. Operation of selective signaling systems employing reed selectors is dependent upon the selectors receiving the particular resonant frequencies at such a level as to cause the selectors to vibrate. If noise were able to operate the automatic gain control of the system, signals which include the particular resonant frequencies of the selectors may not, upon being received at the selectors, have adequate level to cause the reeds to vibrate and therefore may prevent the complete operation of the signaling system. Also, noise by effecting the reduction of the output level of the receiver significantly limits the signaling range of the receiver, for as the distance from a signaling source is increased, the signal to noise ratio decreases. It is therefore desirable in providing a receiver with automatic output control to have this control unaffected by broadband noise conditions.

Also, in portable selective signaling systems, and particularly in personal signaling systems using pocket radio receivers, it is desirable to increase the operating life of the biasing battery which serves as the sole source of operating currents.

It is therefore an object of the invention to reduce the possibility of false signaling in selective signaling systems employing radio receivers and tuned reed selectors.

Another object of the invention is to maintain the signaling range of selective signaling systems employing radio receivers and tuned reed selectors when operating under conditions of high level noise.

It is a further object of this invention to reduce the possibility of noise induced signaling failure in selective signaling systems employing radio receivers and tuned reed selectors.

It is still a further object of this invention to increase the life of the battery power supplies used in portable selective signaling receivers of the type here involved.

In accordance with the above objects a selector unit, containing at least one tuned reed selector, is connected across the output of a radio receiver. By way of example only, the selector unit in the specific embodiment herein disclosed comprises a bridge circuit including two tuned reed selectors. Each reed selector is tuned for a particular resonant frequency and the bridge is balanced at all frequencies except the resonant frequencies of either or both of the reeds. Associated with each selector is a circuit including contact means which, upon vibration of the selector reeds, will close. These circuits may be so interconnected that upon vibration of all selector reeds, a signaling circuit is completed. As taught in the patent to L. G. Bostwick, 2,630,482, issued March 3, 1953, the application of a signal including a resonant frequency to the bridge circuit will unbalance the bridge by changing the motional impedance of the corresponding reed selector, and thereby produce a voltage across the output of a bridge circuit. According to the present invention, this voltage is then fed back into the receiver, modified and used to either increase the output level of the power stage of the receiver, or supply the receiver with automatic output level control, or both. By applying the feedback voltage to the output stage so as to increase the level of output, the receiver can be operated in a normally low current drain condition which will increase the life of the battery power supply. By utilizing the feedback voltage to produce automatic output level control, the maximum output of the receiver can be controlled so as to eliminate false signaling caused by overloading the reed selectors.

A major feature of this invention is that neither the means for increasing the output level nor the automatic output level control will be affected by broadband noise which would dominate other systems, for the feedback which produces this control is extremely selective in nature.

The above and other features of the invention will be considered in detail in the following specification taken in connection with the drawing, the single figure of which discloses, by way of example, a specific embodiment of the invention including both a means for increasing the output level of the receiver, thereby allowing the use of a low current drain from the biasing battery when in a standby condition, and means for limiting the output level of the receiver to levels not greater than the optimum operating level of the selectors, thereby eliminating false signaling caused by the slow release time of the reeds.

The drawing shows a signaling receiver comprising a typical transistorized superheterodyne radio receiver and a reed selector unit. All operating currents for the transistors associated with the receiver are furnished by a common battery source.

The selector unit coupled to the output of the receiver comprises a balanced bridge circuit including two tuned reed selectors. Associated with each selector reed is a contact means. Upon the closing of all contacts, a circuit is completed to an oscillator. Coupled to the output of the oscillator is sound radiator or speaker, which emits an audible sound upon the production of oscillations in the tuned circuit of the oscillator. Any output caused by the unbalance of the bridge circuit is fed back into the receiver circuit through one or both of two circuits which increase the output level of the receiver and reduce or limit the output level of the receiver, respectively.

With this general picture in mind, reference may be had to the following detailed description in which an input signal, containing the resonant frequencies of the reeds, is traced through the circuits of the specific embodiment disclosed in the drawing.

A radio signal modulated by the resonant frequencies of the particular selector reeds is applied to the receiver at an input 10 and is coupled into the first stage of the receiver, an oscillator-mixer 12 which produces among others an intermediate frequency signal which is abstracted in a tuned circuit 14. This signal is coupled by a transformer 16 to the second stage of the receiver which comprises an intermediate frequency amplifier including a transistor 18. The amplified signal appearing across a tuned circuit 20 is coupled by a transformer 22 to a transistor 24 which constitutes a second intermediate frequency amplifier stage. The output of transistor 24 appearing in a tuned circuit 26 is coupled through a transformer 28 to the demodulator or detector 30 of the radio receiver. The output of the detector, which is of audio frequency, and includes the frequencies to which the selectors are tuned, is applied to a transistor 32, there amplified and applied to the output transformer 34.

Coupled across the output of the receiver by transformer 34 is a balanced bridge circuit consisting of two parallel arms. The first arm contains tuned reed selectors 36 and 38 connected in series. The second arm contains impedances here shown as resistor 40, potentiometer 42 and resistor 44 also connected in a series arrangement. These impedances balance the bridge circuit at all frequencies except the resonant frequencies of the selectors. As explained in the patent to Bostwick, referred to above, when an input signal including the resonant frequency of one of the selectors is received by the bridge circuit, the particular reed begins to vibrate and the motional impedance of the selector changes and unbalances the bridge, producing an output voltage at the frequency of the reed. Therefore, in this example, the resonant frequencies of the reeds applied to the bridge circuit through transformer 34 unbalance the bridge and produce a voltage across the output of the bridge circuit which includes both resonant frequencies. Leads 46 and 48 are the output leads of the balanced bridge. Lead 46 is connected between the movable contact of potentiometer 42 and the negative terminal of a battery 50 which supplies all voltages required for the receiver. Lead 48 is connected between the junction of the windings of selectors 36 and 38 and the base of a transistor 52. The output leads of the bridge act as a means for applying the voltage produced across the bridge as a feedback to the radio receiver. Transistor 52 is normally biased to an operating condition by battery 50. Therefore, any signal which is applied to transistor 52 will be passed. The voltage which is produced upon the unbalancing of the bridge circuit is applied between the base and emitter of transistor 52. The amplified alternating current output appears between the collector and emitter of transistor 52. This current is applied to two circuits 56 and 58 which are connected in parallel with collector resistor 54.

Circuit 56 consists of a capacitor 60 and a resistor 62 connected in series between the collector of transistor 52 and the positive side of battery 50. Branching from the junction between capacitor 60 and resistor 62 is a diode 64 which is connected to the base of transistor 32 through a resistor 66 and to the positive side of battery 50 by a capacitor 68. One of the alternating current paths between the emitter and collector of transistor 52 is through capacitor 70, capacitor 68, diode 64, capacitor 60 to transistor 52. Due to diode 64, the alternating current in this path is rectified so as to flow only in a direction to increase the potential on capacitor 68. This increase in potential makes the negative side of capacitor 68 more negative, which in turn makes the potential at the base of transistor 32 more negative, thereby increasing the base current in transistor 32. The increase in base current in turn increases the output of transistor 32 and therefore increases the output level of the receiver.

The alternating current output of transistor 52 is also applied to circuit 58. Circuit 58 includes a capacitor 72 and a potentiometer 74 in series between the collector of transistor 52 and the negative side of battery 50. A diode 76 and a capacitor 78 are connected in series between the variable arm of potentiometer 74 and the negative side of battery 50. Branching from the junction between diode 76 and capacitor 78 is resistor 80, which is connected to the positive side of battery 50. One alternating current path from the emitter to the collector of transistor 52 is through capacitor 78, diode 76, potentiometer 74, and capacitor 72. Due to diode 76, this alternating current is rectified whereby it is allowed to flow only in such a direction as to reduce the potential on capacitor 78. This in turn reduces the positive bias on the base of transistor 18. The reduction of the positive bias reduces the output of transistor 18, thereby reducing or limiting the output level of the receiver.

It is desirable in this particular embodiment to allow the output level of the receiver to normally be at a low point, thereby normally requiring a low current drain from battery 50. When the particular resonant frequencies of the selectors are present, it is desired that the output level of the receiver increase to the optimum operating level of the reeds. This is accomplished by the feedback signal which is applied to circuit 56. If then, after the output level of the receiver is increased, the signal received by the selectors is such that it might overload the selectors, it is desired that the output level of the receiver be reduced or limited to the optimum operating level of the selectors. This is accomplished by the feedback signal which is applied to circuit 58. By adjusting potentiometer 74, one can limit the amount of voltage which appears across capacitor 78 and therefore set the level at which circuit 58 will operate to control or limit the output level of the receiver.

Associated with selectors 36 and 38 are contact pairs 82 and 84, respectively. Upon receiving the particular resonant frequencies, the reeds will vibrate and close the associated contacts. This closure completes a circuit to oscillator 86 from the negative terminal of battery 50. Oscillator 86 is a transistorized Colpitts type oscillator. More particularly, the closing of contacts 82 and 84 allows capacitor 88 to charge from battery 50 and causes the base of transistor 90 to become negative with respect to the emitter and thereby become operative. By passage of current from transistor 90, initial oscillations are set up in tank circuit 92. As is common in Colpitts oscillators, feedback to sustain oscillations is from tank circuit 92 to the base of transistor 90. The coil 94 of the tank circuit is the energizing coil of a sound radiator 96 which produces an audible tone in response to oscillations in tank circuit 92, thereby completing the signaling operation.

Due to the relatively short time during which the resonant frequencies are applied to the selectors, thereby causing the production of oscillations in tank circuit 92, it is felt that some mode of sustaining oscillations after the resonant signals have ceased may become necessary to properly alert the person being signaled. To accomplish this, the potential on capacitor 88 must be maintained. Accordingly, part of the output from transistor 90 is shunted through resistor 98, capacitor 100, and diode 102 to capacitor 88. Diode 102 permits only a rectified or unidirectional current to pass through capacitor 88 thereby sustaining the charge and potential thereon. Consequently, the base potential of transistor 90 is maintained and oscilaltions persist in tank circuit 92 for a substantial time after the resonant signals have ceased to close contacts 82 and 84. The time during which oscillations so continue depends upon the relative rates of discharge and charge of capacitor 88 and obviously may be adjusted as desired.

It is to be noted that the operation of the feedback circuits of the signaling receiver is not affected by broadband noise which would dominate in more conventional gain controlling arrangements. This is due to the critical tuning of the reed selectors to particular frequencies, for only those frequencies will produce both selective signaling of the receiver and a voltage which is fed back into the receiver to produce the output level control.

The above-described embodiment is but an example of the invention. Numerous arrangements can readily be devised in accordance with the principles of the invention. One might construct a circuit utilizing only the output limiting means in combination with a receiver, selective unit (bridge circuit), and signaling means (oscillator and sound radiator). Another embodiment might utilize only the level increasing circuit in combination with the receiver, selective unit (bridge circuit), and signaling means. One might construct a selective unit which does not involve a bridge circuit or could readily construct a bridge circuit utilizing different types and numbers of selectors which would still fall within the scope of the present invention.

What is claimed is:

1. A selective signaling device comprising in combination with a radio receiver an electrical bridge circuit shunting the output of said receiver, said bridge circuit having four arms at least one of which comprises a tuned reed selector, said bridge being balanced at all frequencies except the resonant frequency of said reed selector, means for utilizing the output voltage produced upon the unbalance of said bridge circuit to modify the output level of said receiver, contact means operated by the vibration of said selector, and means for producing a signal responsive to the operation of said contact means.

2. A selective signaling device comprising in combination with a radio receiver an electrical bridge circuit shunting the output of said receiver, said bridge circuit having four arms at least one of which comprises a tuned reed selector, said bridge being balanced at all frequencies except the resonant frequency of said reed selector, means for utilizing the output voltage produced upon the unbalance of said bridge circuit to reduce the output level of said receiver, contact means operated by the vibration of said selector, and means for producing a signal responsive to the operation of said contact means.

3. A selective signaling device comprising in combination with a radio receiver an electrical bridge circuit shunting the output of said receiver, said bridge circuit having four arms at least one of which comprises a tuned reed selector, said bridge being balanced at all frequencies except the resonant frequency of said reed selector, means for utilizing the output voltage produced upon the unbalance of said bridge circuit to increase the output level of said receiver, contact means operated by the vibration of said selector, and means for producing a signal responsive to the operation of said contact means.

4. A selective signaling device comprising in combination with a radio receiver an electrical bridge circuit shunting the output of said receiver, said bridge circuit having four arms at least one of which is a tuned reed selector, said bridge being balanced at all frequencies except the resonant frequency of said reed selector, means for utilizing the output voltage produced upon the unbalance of said bridge circuit to first increase the output level and then limit the output level of said receiver, contact means operated by the vibration of said selector, and means for producing a signal responsive to the operation of said contact means.

5. A selective signaling device comprising in combination with a radio receiver having at least an intermediate stage and a power stage, at least one reed selector connected to the output of said receiver, said reed selector having an operating path and contact means operated by the vibration of said selector upon the application of a predetermined frequency to said operating path, means for producing a signal responsive to the operation of said contact means, means for feeding the voltage produced in said operating path upon the vibration of said reed selector back into said receiver, means connected to the power stage of said receiver for receiving the feedback signal from said operating path, means for applying said feedback signal to said power stage to increase the output level of said receiver, means connected to the intermediate frequency stage of said receiver for receiving the feedback signal from said operating path, and means for applying said feedback signal to said intermediate frequency stage to limit the output level of said receiver.

6. A selective signaling device in accordance with claim 5, in which said reed selector comprises one arm of an electrical bridge circuit having four arms and shunting said receiver output, said bridge being balanced at all frequencies except the resonant frequency of said reed selector.

7. A combination as claimed in claim 5 including means for controlling the amount of feedback voltage which is applied to the intermediate frequency stage of said receiver, thereby allowing the output level of the receiver to first increase and then be limited in level.

8. In a selective signaling device responsive only to predetermined frequencies modulated upon a radio frequency wave, a receiver for accepting and demodulating said wave, means located in said receiver responsive to an external signal for modifying the level of the demodulated output of said receiver in inverse relation to the level of said external signal, at least one reed selector connected to receive the demodulated output of said radio receiver, said reed selector having an operating path and a controlled circuit path completed by the application of one of said predetermined frequencies to said operatnig path, means for applying the demodulated output of said receiver to said operating path of said reed selector, said operating path passing only those voltages from the receiver which are of the predetermined frequency, means for feeding back to said modifying means as said external signal said voltages passed by said operating path, and means for producing a sensory indication responsive to the completion of said controlled circuit.

References Cited in the file of this patent

UNITED STATES PATENTS

| | | |
|---|---|---|
| 2,244,725 | Peterson | June 10, 1941 |
| 2,277,469 | Whitelock | Mar. 24, 1942 |
| 2,489,202 | Selinger | Nov. 22, 1949 |
| 2,602,853 | Harrison | July 8, 1952 |
| 2,626,384 | Winkler | Jan. 20, 1953 |
| 2,630,482 | Bostwick | Mar. 3, 1953 |
| 2,899,547 | Crow et al. | Aug. 11, 1959 |